United States Patent
Kawabata (10) Patent No.: US 9,100,593 B2
(45) Date of Patent: Aug. 4, 2015

(54) RELAY APPARATUS AND COMPUTER-READABLE MEDIUM

(71) Applicant: FUJI XEROX CO., LTD., Tokyo (JP)

(72) Inventor: Hirotaka Kawabata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/956,808

(22) Filed: Aug. 1, 2013

(65) Prior Publication Data

US 2014/0233073 A1 Aug. 21, 2014

(30) Foreign Application Priority Data

Feb. 19, 2013 (JP) .................................. 2013-029735

(51) Int. Cl.
*H04N 1/32* (2006.01)
*H04N 1/00* (2006.01)

(52) U.S. Cl.
CPC ......... *H04N 1/32406* (2013.01); *H04N 1/0022* (2013.01); *H04N 1/32122* (2013.01); *H04N 2201/0074* (2013.01); *H04N 2201/0093* (2013.01); *H04N 2201/3202* (2013.01); *H04N 2201/3209* (2013.01); *H04N 2201/3214* (2013.01); *H04N 2201/3215* (2013.01); *H04N 2201/3216* (2013.01); *H04N 2201/3219* (2013.01); *H04N 2201/3221* (2013.01); *H04N 2201/3223* (2013.01); *H04N 2201/3274* (2013.01)

(58) Field of Classification Search
None
See application file for complete search history.

(56) References Cited

U.S. PATENT DOCUMENTS

| | | | |
|---|---|---|---|
| 6,359,974 B1 * | 3/2002 | Ishibashi | 379/100.06 |
| 6,512,593 B1 * | 1/2003 | Yashiki | 358/1.15 |
| 7,069,503 B2 * | 6/2006 | Tanimoto | 715/202 |
| 7,480,065 B1 * | 1/2009 | Trandal et al. | 358/1.15 |
| 7,492,473 B2 * | 2/2009 | Ferlitsch et al. | 358/1.15 |
| 7,826,102 B2 * | 11/2010 | Nakamura | 358/407 |
| 2002/0051146 A1 * | 5/2002 | Tanimoto | 358/1.9 |
| 2003/0016394 A1 | 1/2003 | Shinomiya | |
| 2004/0174558 A1 * | 9/2004 | Mori | 358/1.15 |
| 2004/0252348 A1 * | 12/2004 | Desai | 358/400 |
| 2006/0149718 A1 * | 7/2006 | Ohzaki | 707/3 |
| 2007/0086061 A1 * | 4/2007 | Robbins | 358/400 |
| 2007/0146802 A1 * | 6/2007 | Ushida | 358/402 |
| 2010/0208726 A1 * | 8/2010 | Oliszewski et al. | 370/352 |
| 2012/0274988 A1 * | 11/2012 | Bloomfield | 358/402 |
| 2013/0088741 A1 * | 4/2013 | Murata et al. | 358/1.14 |
| 2013/0287189 A1 * | 10/2013 | Cichielo et al. | 379/100.17 |
| 2013/0293933 A1 * | 11/2013 | Rebert et al. | 358/407 |

FOREIGN PATENT DOCUMENTS

| | | |
|---|---|---|
| JP | A-2003-78703 | 3/2003 |
| JP | A-2004-241870 | 8/2004 |
| WO | WO 0160050 A1 * | 8/2001 |

\* cited by examiner

*Primary Examiner* — Kimberly A Williams
(74) *Attorney, Agent, or Firm* — Oliff PLC (57) ABSTRACT

A relay apparatus includes a reception section, a facsimile communication section, and a generation section. From terminal apparatuses having no facsimile transmission functions, the reception section receives facsimile transmission instructions along with pieces of identification information of the terminal apparatuses via a private network. The facsimile communication section performs facsimile transmission via a public network to the outside on the basis of the facsimile transmission instructions received by the reception section. The generation section generates pieces of communication result information about facsimile transmission for the respective pieces of identification information corresponding to the terminal apparatuses when the facsimile communication section performs the facsimile transmission to the outside.

8 Claims, 11 Drawing Sheets

| DOCUMENT NUMBER | START DATE AND TIME | TARGET | REQUIRED TIME | THE NUMBER OF PAGES | MODE | COMMUNICATION TYPE | DISTRIBUTION BOX | COMMUNICATION RESULT |
|---|---|---|---|---|---|---|---|---|
| 001 | 10-3; 17:25 | 03-AAAA-1111 | 12 SECONDS | 2 PAGES | SG3 | DESTINATION NUMBER DISTRIBUTION | 020 | NORMAL END |
| 002 | 10-3; 19:25 | 044-BBB-9911 | 17 SECONDS | 5 PAGES | SG3 | DESTINATION NUMBER DISTRIBUTION | 010 | NORMAL END |
| 003 | 10-4; 8:26 | 03-AAAA-1122 | 15 SECONDS | 4 PAGES | SG3 | DESTINATION NUMBER DISTRIBUTION | 050 | ABNORMAL END |
| 004 | 10-4; 8:27 | 044-BBB-9911 | 10 SECONDS | 1 PAGE | G3 | DESTINATION NUMBER DISTRIBUTION | 030 | NORMAL END |
| 005 | 10-4; 8:37 | 044-BBB-9999 | 15 SECONDS | 4 PAGES | SG3 | DESTINATION NUMBER DISTRIBUTION | 010 | NORMAL END |
| 006 | 10-4; 9:00 | 03-AAAA-1133 | 14 SECONDS | 4 PAGES | SG3 | DESTINATION NUMBER DISTRIBUTION | 010 | NORMAL END |
| 007 | 10-4; 9:04 | 044-BBB-9933 | 12 SECONDS | 3 PAGES | SG3 | DESTINATION NUMBER DISTRIBUTION | 040 | NORMAL END |
| 008 | 10-4; 10:29 | 0522-BBB-3333 | 8 SECONDS | 1 PAGE | G3 ECM | DESTINATION NUMBER DISTRIBUTION | 010 | ABNORMAL END |
| 009 | 10-4; 11:30 | 03-AAAA-1155 | 17 SECONDS | 5 PAGES | SG3 | — | — | NORMAL END |
| 010 | 10-4; 12:30 | 044-BBB-9988 | 18 SECONDS | 6 PAGES | G3 ECM | DESTINATION NUMBER DISTRIBUTION | 010 | NORMAL END |
| 011 | 10-4; 13:41 | 0522-BBB-3344 | 14 SECONDS | 4 PAGES | SG3 | DESTINATION NUMBER DISTRIBUTION | 010 | NORMAL END |
| 012 | 10-4; 13:50 | 03-AAAA-1166 | 15 SECONDS | 4 PAGES | SG3 | — | — | NORMAL END |
| 013 | 10-4; 13:55 | 0522-BBB-3333 | 13 SECONDS | 3 PAGES | SG3 | DESTINATION NUMBER DISTRIBUTION | 020 | NORMAL END |
| 014 | 10-4; 14:32 | 044-BBB-9911 | 11 SECONDS | 2 PAGES | G3 ECM | DESTINATION NUMBER DISTRIBUTION | 030 | NORMAL END |
| 015 | 10-4; 14:34 | 03-AAAA-1177 | 15 SECONDS | 4 PAGES | SG3 | DESTINATION NUMBER DISTRIBUTION | 010 | NORMAL END |
| 016 | 10-4; 14:35 | 0522-BBB-3344 | 14 SECONDS | 4 PAGES | SG3 | DESTINATION NUMBER DISTRIBUTION | 020 | NORMAL END |
| 017 | 10-4; 15:35 | 044-BBB-8833 | 40 SECONDS | 2 PAGES | G3 ECM | DESTINATION NUMBER DISTRIBUTION | 010 | ABNORMAL END |
| 018 | 10-4; 16:01 | 03-AAAA-1111 | 15 SECONDS | 4 PAGES | SG3 | DESTINATION NUMBER DISTRIBUTION | 010 | NORMAL END |
| 019 | 10-4; 16:15 | 06-CCCC-2211 | 90 SECONDS | 8 PAGES | G3 | DESTINATION NUMBER DISTRIBUTION | 010 | NORMAL END |
| 020 | 10-4; 16:36 | 03-AAAA-1199 | 13 SECONDS | - PAGES | G3 | — | — | ABNORMAL END |

| COMMUNICATION MANAGEMENT REPORT (RECEPTION) | | | | | IP ADDRESS | 192.168.1.25 |

G3ID: 045-XXXX-1111
DIVISION NAME: FXAT AAA DEVELOPMENT DIV.
SENDER NAME: FXAT AAA DEVELOPMENT DIVISION

DATE AND TIME: 10/04 2011 16:36
PAGE: 1

| NO. | DOCUMENT NUMBER | START DATE AND TIME | TARGET | REQUIRED TIME | THE NUMBER OF PAGES | MODE | COMMUNICATION RESULT |
|---|---|---|---|---|---|---|---|
| 1 | 002 | 10-3; 19:25 | 044-BBB-9911 | 17 SECONDS | 5 PAGES | SG3 | NORMAL END |
| 2 | 005 | 10-4; 8:37 | 044-BBB-9999 | 15 SECONDS | 4 PAGES | SG3 | NORMAL END |
| 3 | 006 | 10-4; 9:00 | 03-AAAA-1133 | 14 SECONDS | 4 PAGES | SG3 | NORMAL END |
| 4 | 008 | 10-4; 10:29 | 0522-BBB-3333 | 8 SECONDS | 1 PAGE | G3 ECM | ABNORMAL END |
| 5 | 010 | 10-4; 12:30 | 044-BBB-9988 | 18 SECONDS | 6 PAGES | SG3 | NORMAL END |
| 6 | 011 | 10-4; 13:41 | 0522-BBB-3344 | 14 SECONDS | 4 PAGES | SG3 | NORMAL END |
| 7 | 015 | 10-4; 14:34 | 03-AAAA-1177 | 15 SECONDS | 4 PAGES | SG3 | NORMAL END |
| 8 | 017 | 10-4; 15:35 | 044-BBB-8833 | 40 SECONDS | 2 PAGES | G3 ECM | ABNORMAL END |
| 9 | 018 | 10-4; 16:01 | 03-AAAA-1111 | 15 SECONDS | 4 PAGES | SG3 | NORMAL END |
| 10 | 019 | 10-4; 16:15 | 06-CCCC-2211 | 90 SECONDS | 8 PAGES | G3 | NORMAL END |

| DOCUMENT NUMBER | START DATE AND TIME | TARGET | REQUIRED TIME | THE NUMBER OF PAGES | MODE | COMMUNICATION TYPE | INSTRUCTION SOURCE | COMMUNICATION RESULT |
|---|---|---|---|---|---|---|---|---|
| 001 | 10-3; 17:25 | 03-AAAA-1111 | 12 SECONDS | 2 PAGES | SG3 | IFAX OFF-RAMP | 192.168.1.20 | NORMAL END |
| 002 | 10-3; 19:25 | 044-BBB-1111 | 17 SECONDS | 5 PAGES | SG3 | IFAX OFF-RAMP | 192.168.1.25 | NORMAL END |
| 003 | 10-4; 8:26 | 03-AAAA-1122 | 15 SECONDS | 4 PAGES | SG3 | — | — | ABNORMAL END |
| 004 | 10-4; 8:27 | 044-BBB-9911 | 10 SECONDS | 1 PAGE | G3 | IFAX OFF-RAMP | 192.168.1.30 | NORMAL END |
| 005 | 10-4; 8:37 | 044-BBB-9999 | 15 SECONDS | 4 PAGES | SG3 | IFAX OFF-RAMP | 192.168.1.25 | NORMAL END |
| 006 | 10-4; 9:00 | 03-AAAA-1133 | 14 SECONDS | 4 PAGES | SG3 | IFAX OFF-RAMP | 192.168.1.25 | NORMAL END |
| 007 | 10-4; 9:04 | 044-BBB-9933 | 12 SECONDS | 3 PAGES | G3 ECM | IFAX OFF-RAMP | 192.168.1.45 | NORMAL END |
| 008 | 10-4; 10:29 | 0522-BBB-3333 | 8 SECONDS | 1 PAGE | G3 ECM | IFAX OFF-RAMP | 192.168.1.25 | ABNORMAL END |
| 009 | 10-4; 11:30 | 03-AAAA-1155 | 17 SECONDS | 5 PAGES | SG3 | IFAX OFF-RAMP | 192.168.1.30 | NORMAL END |
| 010 | 10-4; 12:30 | 044-BBB-9968 | 18 SECONDS | 6 PAGES | SG3 | IFAX OFF-RAMP | 192.168.1.25 | NORMAL END |
| 011 | 10-4; 13:41 | 0522-BBB-3344 | 14 SECONDS | 4 PAGES | SG3 | IFAX OFF-RAMP | 192.168.1.25 | NORMAL END |
| 012 | 10-4; 13:50 | 03-AAAA-1166 | 15 SECONDS | 4 PAGES | SG3 | IFAX OFF-RAMP | 192.168.1.45 | NORMAL END |
| 013 | 10-4; 13:55 | 0522-BBB-3333 | 13 SECONDS | 3 PAGES | SG3 | IFAX OFF-RAMP | 192.168.1.20 | NORMAL END |
| 014 | 10-4; 14:32 | 044-BBB-9911 | 11 SECONDS | 2 PAGES | G3 ECM | — | — | NORMAL END |
| 015 | 10-4; 14:34 | 03-AAAA-1177 | 15 SECONDS | 4 PAGES | SG3 | IFAX OFF-RAMP | 192.168.1.25 | NORMAL END |
| 016 | 10-4; 14:35 | 0522-BBB-3344 | 14 SECONDS | 4 PAGES | SG3 | IFAX OFF-RAMP | 192.168.1.40 | NORMAL END |
| 017 | 10-4; 15:35 | 044-BBB-8833 | 40 SECONDS | 2 PAGES | G3 ECM | IFAX OFF-RAMP | 192.168.1.25 | ABNORMAL END |
| 018 | 10-4; 16:01 | 03-AAAA-1111 | 15 SECONDS | 4 PAGES | SG3 | IFAX OFF-RAMP | 192.168.1.25 | NORMAL END |
| 019 | 10-4; 16:15 | 06-CCCC-2211 | 90 SECONDS | 8 PAGES | SG3 | IFAX OFF-RAMP | 192.168.1.25 | NORMAL END |
| 020 | 10-4; 16:36 | 03-AAAA-1199 | 13 SECONDS | — PAGES | G3 | — | — | ABNORMAL END |

| | | | COMMUNICATION MANAGEMENT REPORT (TRANSMISSION) | | IP ADDRESS | 192.168.1.25 | |
|---|---|---|---|---|---|---|---|

G3ID: 045-XXXX-1111  
DIVISION NAME: FXAT AAA DEVELOPMENT DIV.  
SENDER NAME: FXAT AAA DEVELOPMENT DIVISION

DATE AND TIME: 10/04 2011 16:36  
PAGE: 1

| NO. | DOCUMENT NUMBER | START DATE AND TIME | TARGET | REQUIRED TIME | THE NUMBER OF PAGES | MODE | COMMUNICATION RESULT |
|---|---|---|---|---|---|---|---|
| 1 | 002 | 10-3; 19:25 | 044-BBB-9911 | 17 SECONDS | 5 PAGES | SG3 | NORMAL END |
| 2 | 005 | 10-4; 8:37 | 044-BBB-9999 | 15 SECONDS | 4 PAGES | SG3 | NORMAL END |
| 3 | 006 | 10-4; 9:00 | 03-AAAA-1133 | 14 SECONDS | 4 PAGES | SG3 | NORMAL END |
| 4 | 008 | 10-4; 10:29 | 0522-BBB-3333 | 8 SECONDS | 1 PAGE | G3 ECM | ABNORMAL END |
| 5 | 010 | 10-4; 12:30 | 044-BBB-9988 | 18 SECONDS | 6 PAGES | SG3 | NORMAL END |
| 6 | 011 | 10-4; 13:41 | 0522-BBB-3344 | 14 SECONDS | 4 PAGES | SG3 | NORMAL END |
| 7 | 015 | 10-4; 14:34 | 03-AAAA-1177 | 15 SECONDS | 4 PAGES | SG3 | NORMAL END |
| 8 | 017 | 10-4; 15:35 | 044-BBB-8833 | 40 SECONDS | 2 PAGES | G3 ECM | ABNORMAL END |
| 9 | 018 | 10-4; 16:01 | 03-AAAA-1111 | 15 SECONDS | 4 PAGES | SG3 | NORMAL END |
| 10 | 019 | 10-4; 16:15 | 06-CCCC-2211 | 90 SECONDS | 8 PAGES | G3 | NORMAL END |

| COMMUNICATION MANAGEMENT REPORT | IP ADDRESS 192.168.1.25 |
|---|---|

G3ID: 045-XXXX-1111  
DIVISION NAME: FXAT AAA DEVELOPMENT DIV.  
SENDER NAME: FXAT AAA DEVELOPMENT DIVISION  
DATE AND TIME: 10/04 2011 16:36  
PAGE: 1

TRANSMISSION

| NO. | DOCUMENT NUMBER | START DATE AND TIME | TARGET | REQUIRED TIME | THE NUMBER OF PAGES | MODE | COMMUNICATION RESULT |
|---|---|---|---|---|---|---|---|
| 1 | 002 | 10-3; 19:25 | 044-BBB-9911 | 17 SECONDS | 5 PAGES | SG3 | NORMAL END |
| 2 | 005 | 10-4; 8:37 | 044-BBB-9999 | 15 SECONDS | 4 PAGES | SG3 | NORMAL END |
| 3 | 006 | 10-4; 9:00 | 03-AAAA-1133 | 14 SECONDS | 4 PAGES | SG3 | NORMAL END |
| 4 | 008 | 10-4; 10:29 | 0522-BBB-3333 | 8 SECONDS | 1 PAGE | G3 ECM | ABNORMAL END |
| 5 | 010 | 10-4; 12:30 | 044-BBB-9988 | 18 SECONDS | 6 PAGES | SG3 | NORMAL END |
| 6 | 011 | 10-4; 13:41 | 0522-BBB-3344 | 14 SECONDS | 4 PAGES | SG3 | NORMAL END |
| 7 | 015 | 10-4; 14:34 | 03-AAAA-1177 | 15 SECONDS | 4 PAGES | SG3 | NORMAL END |
| 8 | 017 | 10-4; 15:35 | 044-BBB-8833 | 40 SECONDS | 2 PAGES | G3 ECM | ABNORMAL END |
| 9 | 018 | 10-4; 16:01 | 03-AAAA-1111 | 15 SECONDS | 4 PAGES | SG3 | NORMAL END |
| 10 | 019 | 10-4; 16:15 | 06-CCCC-2211 | 90 SECONDS | 8 PAGES | G3 | NORMAL END |

RECEPTION

| NO. | DOCUMENT NUMBER | START DATE AND TIME | TARGET | REQUIRED TIME | THE NUMBER OF PAGES | MODE | COMMUNICATION RESULT |
|---|---|---|---|---|---|---|---|
| 1 | 001 | 10-3; 19:10 | 03-AAAA-1133 | 35 SECONDS | 1 PAGE | G3 ECM | NORMAL END |
| 2 | 003 | 10-3; 20:15 | 044-BBB-8833 | 20 SECONDS | 2 PAGES | SG3 | ABNORMAL END |
| 3 | 004 | 10-3; 20:34 | 0522-BBB-3344 | 65 SECONDS | 4 PAGES | G3 | NORMAL END |
| 4 | 007 | 10-4; 9:29 | 044-BBB-9999 | 38 SECONDS | 5 PAGES | SG3 | ABNORMAL END |
| 5 | 009 | 10-4; 10:38 | 044-BBB-9988 | 38 SECONDS | 3 PAGES | G3 ECM | NORMAL END |
| 6 | 012 | 10-4; 13:50 | 06-DCBA-4321 | 24 SECONDS | 4 PAGES | SG3 | ABNORMAL END |
| 7 | 013 | 10-4; 13:59 | 03-ABCD-7654 | 20 SECONDS | 2 PAGES | G3 ECM | NORMAL END |
| 8 | 014 | 10-4; 14:30 | 071-DDD-8833 | 10 SECONDS | 1 PAGE | SG3 | NORMAL END |
| 9 | 016 | 10-4; 15:20 | 06-ABCD-1111 | 45 SECONDS | 3 PAGES | G3 | NORMAL END |
| 10 | 020 | 10-4; 16:36 | 03-AAAA-2211 | 60 SECONDS | 7 PAGES | G3 ECM | NORMAL END |

| COMMUNICATION MANAGEMENT REPORT | | IP ADDRESS | 192.168.1.25 |
|---|---|---|---|

G3ID: 045-XXXX-1111  DATE AND TIME: 10/04 2011 16:36
DIVISION NAME: FXAT AAA DEVELOPMENT DIV.  PAGE: 1
SENDER NAME: FXAT AAA DEVELOPMENT DIVISION

TRANSMISSION

| NO. | DOCUMENT NUMBER | RECEPTION DATE AND TIME OF RELAY APPARATUS | START DATE AND TIME | TARGET | REQUIRED TIME | THE NUMBER OF PAGES | MODE | COMMUNICATION RESULT |
|---|---|---|---|---|---|---|---|---|
| 1 | 002 | 10-3; 19:20 | 10-3; 19:25 | 044-BBB-9911 | 17 SECONDS | 5 PAGES | SG3 | NORMAL END |
| 2 | 005 | 10-4; 8:36 | 10-4; 8:37 | 044-BBB-9999 | 15 SECONDS | 4 PAGES | SG3 | NORMAL END |
| 3 | 006 | 10-4; 9:00 | 10-4; 9:05 | 03-AAAA-1133 | 14 SECONDS | 4 PAGES | SG3 | NORMAL END |
| 4 | 008 | 10-4; 10:00 | 10-4; 10:29 | 0522-BBB-3333 | 8 SECONDS | 1 PAGE | G3 ECM | ABNORMAL END |
| 5 | 010 | 10-4; 12:25 | 10-4; 12:30 | 044-BBB-9988 | 18 SECONDS | 6 PAGES | SG3 | NORMAL END |
| 6 | 011 | 10-4; 13:40 | 10-4; 13:41 | 0522-BBB-3344 | 14 SECONDS | 4 PAGES | SG3 | NORMAL END |
| 7 | 015 | 10-4; 14:30 | 10-4; 14:34 | 03-AAAA-1177 | 15 SECONDS | 4 PAGES | SG3 | NORMAL END |
| 8 | 017 | 10-4; 15:30 | 10-4; 15:35 | 044-BBB-8833 | 40 SECONDS | 2 PAGES | G3 ECM | ABNORMAL END |
| 9 | 018 | 10-4; 16:01 | 10-4; 16:01 | 03-AAAA-1111 | 15 SECONDS | 4 PAGES | SG3 | NORMAL END |
| 10 | 019 | 10-4; 16:15 | 10-4; 16:15 | 06-CCCC-2211 | 90 SECONDS | 8 PAGES | G3 | NORMAL END |

RECEPTION

| NO. | DOCUMENT NUMBER | START DATE AND TIME | TARGET | REQUIRED TIME | THE NUMBER OF PAGES | MODE | TRANSFER DATE AND TIME | COMMUNICATION RESULT |
|---|---|---|---|---|---|---|---|---|
| 1 | 001 | 10-3; 19:10 | 03-AAAA-1133 | 35 SECONDS | 1 PAGE | G3 ECM | 10-3; 19:15 | NORMAL END |
| 2 | 003 | 10-3; 20:15 | 044-BBB-8833 | 20 SECONDS | 2 PAGES | SG3 | 10-3; 20:17 | ABNORMAL END |
| 3 | 004 | 10-3; 20:34 | 0522-BBB-3344 | 65 SECONDS | 4 PAGES | G3 | 10-4; 9:00 | NORMAL END |
| 4 | 007 | 10-4; 9:29 | 044-BBB-9999 | 38 SECONDS | 5 PAGES | SG3 | 10-4; 9:32 | ABNORMAL END |
| 5 | 009 | 10-4; 10:38 | 044-BBB-9988 | 38 SECONDS | 3 PAGES | G3 ECM | 10-4; 10:40 | NORMAL END |
| 6 | 012 | 10-4; 13:50 | 06-DCBA-4321 | 24 SECONDS | 4 PAGES | SG3 | 10-4; 13:55 | ABNORMAL END |
| 7 | 013 | 10-4; 13:59 | 03-ABCD-7654 | 20 SECONDS | 2 PAGES | G3 ECM | 10-4; 14:02 | NORMAL END |
| 8 | 014 | 10-4; 14:30 | 071-DDD-8833 | 10 SECONDS | 1 PAGE | SG3 | 10-4; 14:35 | NORMAL END |
| 9 | 016 | 10-4; 15:20 | 06-ABCD-1111 | 45 SECONDS | 3 PAGES | G3 | 10-4; 15:30 | NORMAL END |
| 10 | 020 | 10-4; 16:36 | 03-AAAA-2211 | 60 SECONDS | 7 PAGES | G3 ECM | 10-4; 17:00 | NORMAL END |

RELAY APPARATUS AND COMPUTER-READABLE MEDIUM

CROSS-REFERENCE TO RELATED APPLICATIONS

This application is based on and claims priority under 35 USC 119 from Japanese Patent Application No. 2013-029735 filed Feb. 19, 2013.

BACKGROUND

Technical Field

The present invention relates to a relay apparatus and a computer-readable medium.

SUMMARY

According to an aspect of the present invention, there is provided a relay apparatus including a reception section, a facsimile communication section, and a generation section. From terminal apparatuses having no facsimile transmission functions, the reception section receives facsimile transmission instructions along with pieces of identification information of the terminal apparatuses via a private network. The facsimile communication section performs facsimile transmission via a public network to the outside on the basis of the facsimile transmission instructions received by the reception section. The generation section generates pieces of communication result information about facsimile transmission for the respective pieces of identification information corresponding to the terminal apparatuses when the facsimile communication section performs the facsimile transmission to the outside.

BRIEF DESCRIPTION OF THE DRAWINGS

Exemplary embodiments of the present invention will be described in detail based on the following figures, wherein:

FIG. 5 is a schematic view illustrating an exemplary configuration of communication result information;

FIG. 8 is a schematic view illustrating an exemplary configuration of communication result information;

FIG. 10 is a schematic view illustrating an exemplary configuration of a communication management report; and FIG. 11 is a schematic view illustrating an exemplary configuration of a communication management report.

DETAILED DESCRIPTION

First Exemplary Embodiment
Configuration of Communication System

Figure 1:
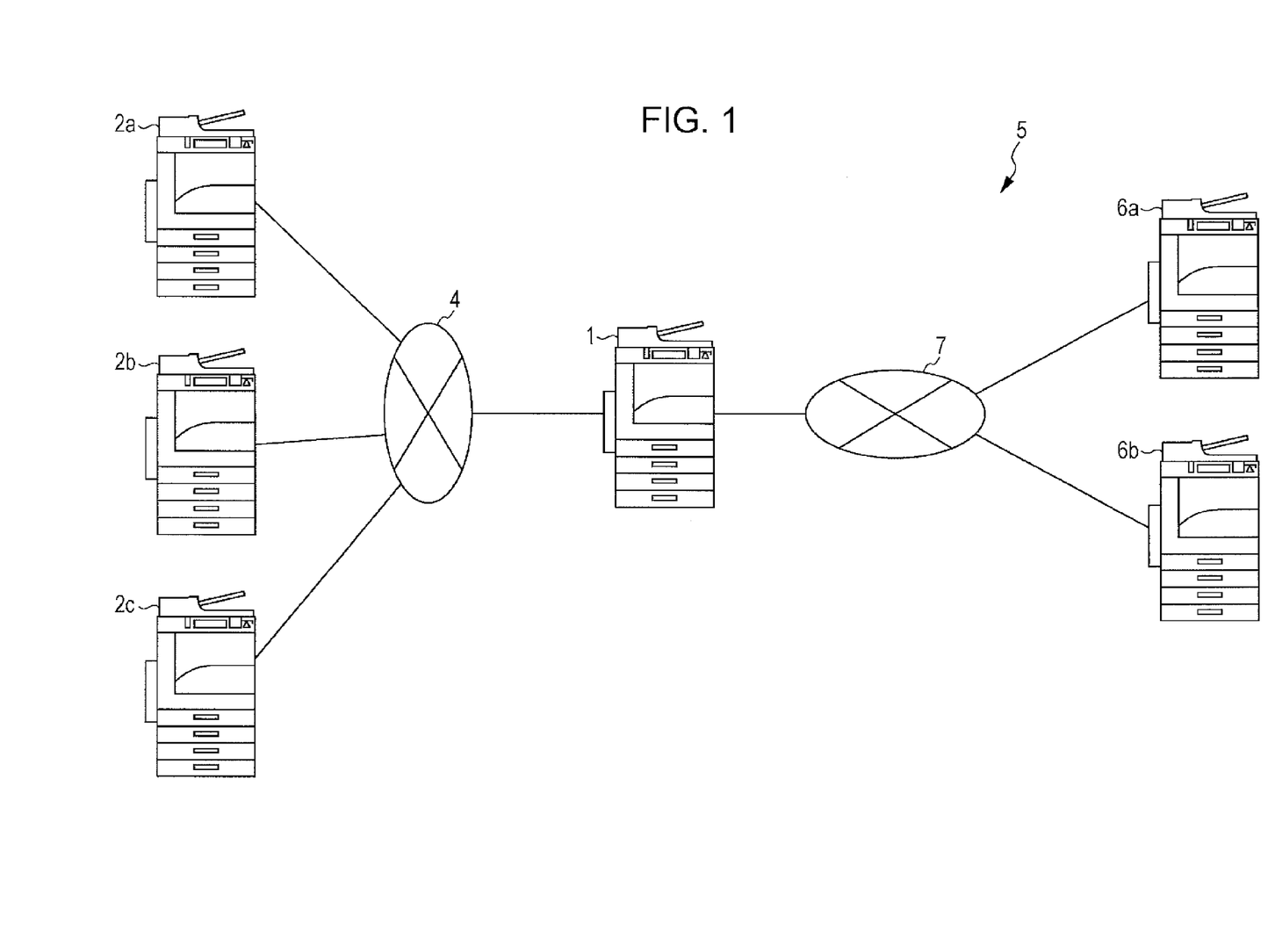
FIG. 1 is a schematic view illustrating an exemplary configuration of a communication system according to an exemplary embodiment of the present invention.

FIG. 1 is a schematic view illustrating an exemplary configuration of a communication system according to a first exemplary embodiment of the present invention.

A communication system 5 includes a relay apparatus 1 and terminal apparatuses 2a to 2c which are connected to each other through a private network 4 so as to be capable of communicating with each other. The relay apparatus 1 is connected to external apparatuses 6a and 6b through a public network 7 so as to be capable of communicating with the external apparatuses 6a and 6b, and receives/transmits information from/to the external apparatuses 6a and 6b by using typically a facsimile (hereinafter, referred to as "FAX") scheme.

The relay apparatus 1 has a FAX transmit/receive function and printer, canner, and copy functions, and includes electronic components, such as a central processing unit (CPU) having a function of processing information and a flash memory. The relay apparatus 1 alone performs FAX transmission. In the first exemplary embodiment, description will be made for the case in which the relay apparatus 1 performs FAX transmission in accordance with FAX transmission instructions transmitted from the terminal apparatuses 2a to 2c on the basis of the Internet FAX (IFAX) standard.

The terminal apparatuses 2a to 2c have no FAX transmit/receive functions but have printer, scanner, and copy functions, and includes electronic components, such as a CPU having a function of processing information and a flash memory. The terminal apparatuses 2a to 2c instruct the relay apparatus 1 to transmit a FAX.

The private network 4 is a communication network which allows high-speed communication, and is a communication network, such as an intranet or a local area network (LAN), which is either wired or wireless.

The external apparatuses 6a and 6b each are any information processing apparatus as long as it has a FAX transmit/receive function, and are, for example, a printer or a personal computer (PC).

The public network 7 is, for example, a communication network that is used on a chargeable basis and that is provided by a communications company, and is an external network, such as a public switched telephone network (PSTN) or an integrated services digital network (ISDN).

Figure 2:
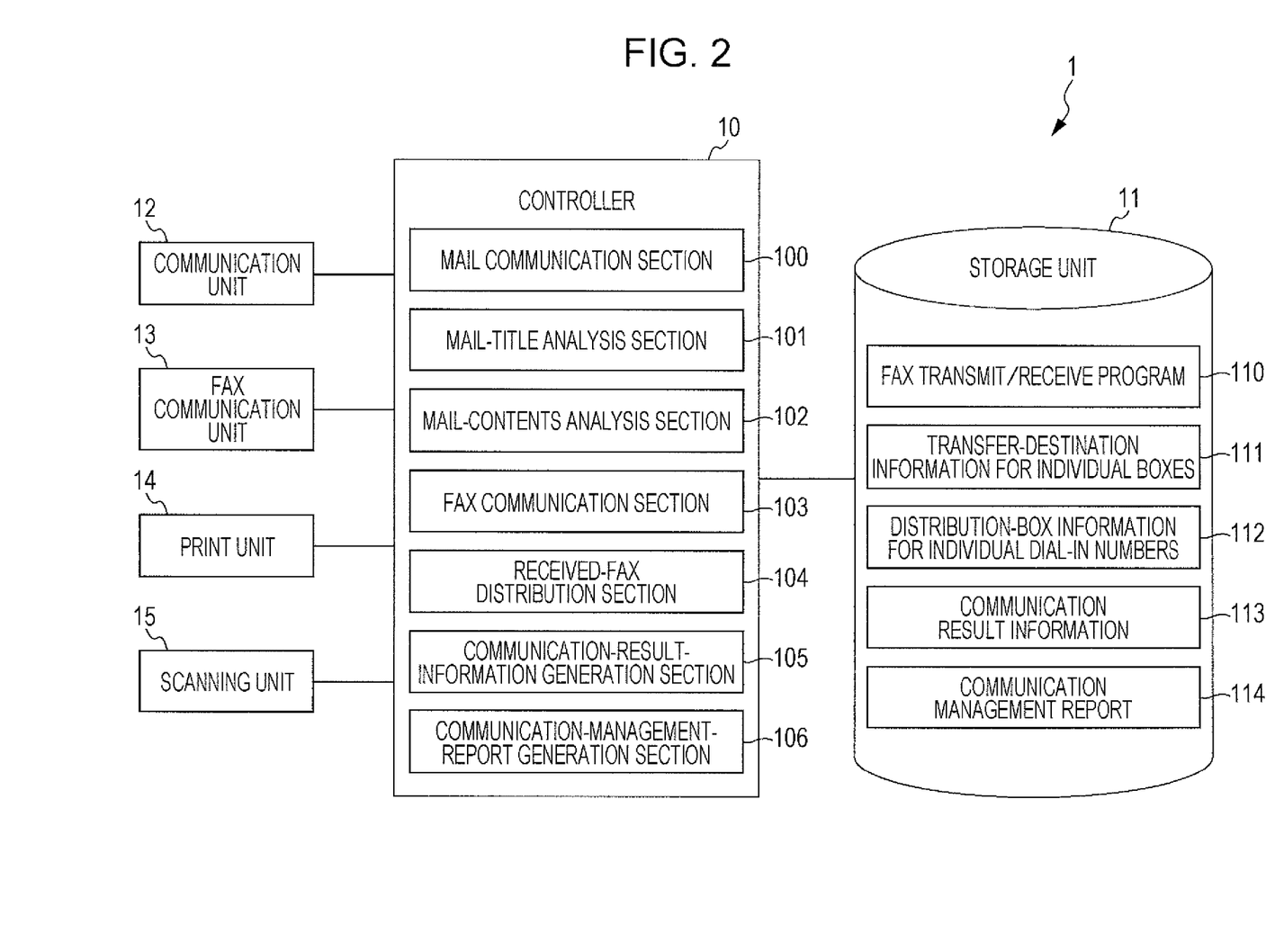
FIG. 2 is a block diagram illustrating an exemplary configuration of a relay apparatus.

FIG. 2 is a block diagram illustrating an exemplary configuration of the relay apparatus 1.

The relay apparatus 1 includes a controller 10 that includes a CPU and the like and that controls the units and executes various programs, a storage unit 11 that includes a storage medium such as a flash memory and that stores information, a communication unit 12 that communicates with the outside via the private network 4, a FAX communication unit 13 that communicates with the outside via the public network 7 by using the FAX scheme, a print unit 14 that performs printing on paper, and a scanning unit 15 that optically scans paper on which characters, images, and the like are written. The relay apparatus 1 may also include a display unit that displays, for example, characters and images, and an operation unit that is used to operate the relay apparatus 1.

The controller 10 executes a FAX transmit/receive program 110 described below, thereby serving as a mail communication section 100, a mail-title analysis section 101, a mail-contents analysis section 102, a FAX communication section 103, a received-FAX distribution section 104, a communication-result-information generation section 105, a communication-management-report generation section 106, and the like.

The mail communication section 100 receives/transmits electronic mails from/to the terminal apparatuses 2a to 2c via the private network 4. The mail communication section 100 also serves as a reception section that receives a mail including especially a FAX transmission instruction using IFAX.

The mail-title analysis section 101 analyzes, for example, the transmission destination of a FAX transmission from the FAX transmission instruction using IFAX which is included in the mail title of an electronic mail received by the mail communication section 100.

The mail-contents analysis section 102 analyzes the setting that is used when a FAX is transmitted, from the contents of an electronic mail received by the mail communication section 100.

The FAX communication section 103 converts analysis results obtained from the mail-title analysis section 101 and the mail-contents analysis section 102 into a signal using the FAX scheme, and controls the FAX communication unit 13 so that the FAX communication unit 13 receives/transmits image information of a document by using the FAX scheme.

The received-FAX distribution section 104 distributes image information of a document received from the outside via the FAX communication unit 13, to a distribution box in accordance with the destination of the document. The relay apparatus 1 uses multiple phone numbers as destinations to perform FAX reception.

When the FAX communication section 103 receives/transmits image information of a document, the communication-result-information generation section 105 collects information, such as the date and time when the document is received/transmitted, the target of the communication, a time period required for the communication, the number of pages of the document, and whether or not the communication is normally completed, and generates a piece of communication result information 113 from the collected information.

The communication-management-report generation section 106 distributes pieces of the communication result information 113 generated by the communication-result-information generation section 105 to the destinations corresponding to the terminal apparatuses 2a to 2c, and generates a communication management report 114.

The storage unit 11 stores, for example, the FAX transmit/receive program 110 for causing the controller 10 to operate as the sections 100 to 106 described above, transfer-destination information 111 for the individual boxes, distribution-box information 112 for individual dial-in numbers, the communication result information 113, and the communication management report 114.

The transfer-destination information 111 for the individual boxes is information in which the identifiers of distribution boxes which temporarily store pieces of image information of documents received through FAX in accordance with the destinations obtained in reception are associated with the IP addresses of the transfer destinations (terminal apparatuses 2a to 2c) allocated to the distribution boxes.

The distribution-box information 112 for individual dial-in numbers is information in which a phone number that is the destination of a document received through FAX is associated with the identifier of a distribution box. Multiple phone numbers are registered using a dial-in scheme in the relay apparatus 1, and the registered numbers are associated with the respective terminal apparatuses 2a to 2c.

The communication unit 12 receives/transmits data via the private network 4 in accordance with a communication protocol such as TCP/IP, and performs control regarding the network and control of reception/transmission of electronic mails.

The FAX communication unit 13 has a modem function of modulating and demodulating image data in accordance with a facsimile protocol, such as G3 or G4, and has a network control unit (NCU) function of controlling connection to the public network 7 so as to perform FAX communication via the public network 7.

Figure 3:
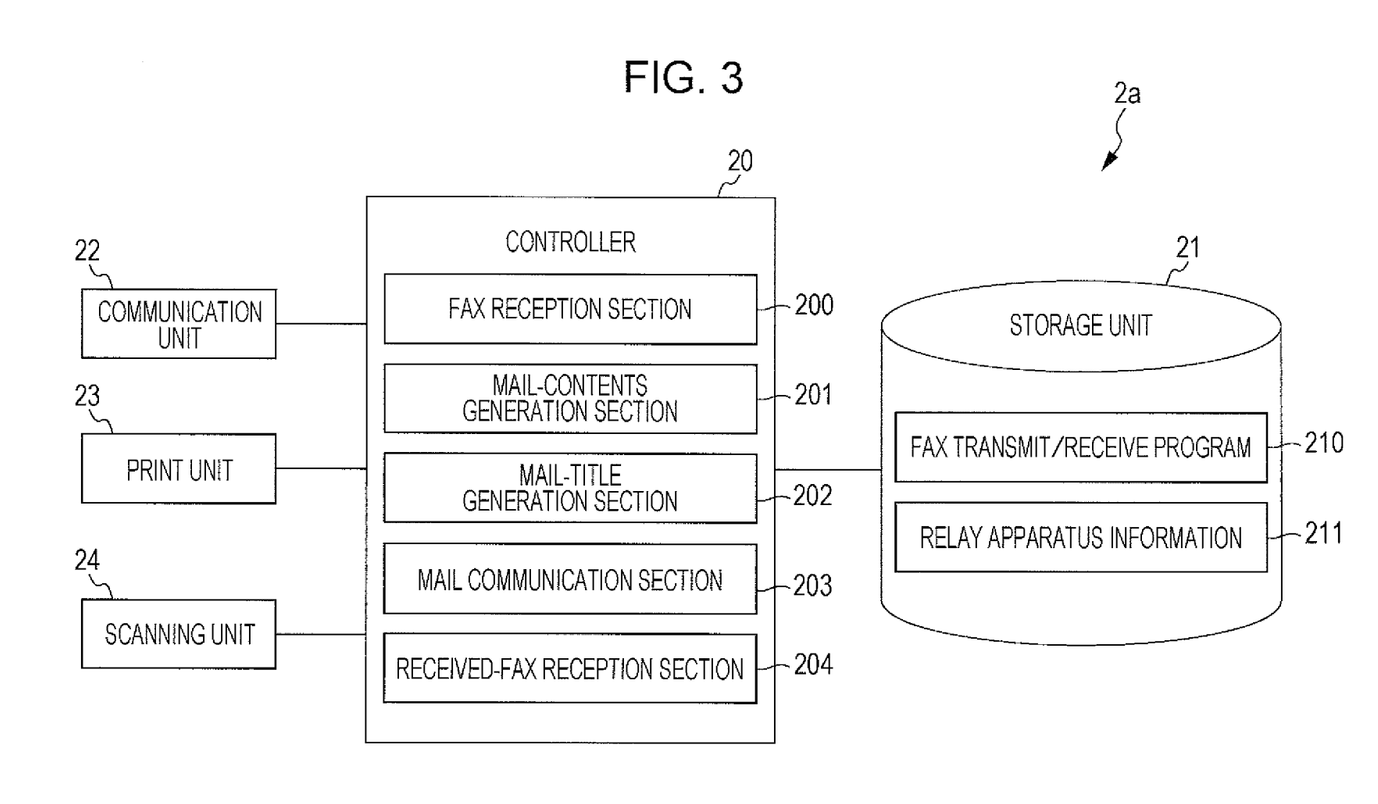
FIG. 3 is a block diagram illustrating an exemplary configuration of a terminal apparatus.

FIG. 3 is a block diagram illustrating an exemplary configuration of the terminal apparatuses 2a to 2c. The configurations of the terminal apparatuses 2a to 2c are similar to each other. Accordingly, description will be made by taking the terminal apparatus 2a as a typical example.

The terminal apparatus 2a includes a controller 20 that includes a CPU and the like and that controls the units and executes various programs, a storage unit 21 that includes a storage medium such as a flash memory and that stores information, a communication unit 22 that communicates with the outside via the private network 4, a print unit 23 that performs printing on paper, and a scanning unit 24 that optically scans paper on which characters, images, and the like are written. The terminal apparatus 2a may also include a display unit that displays, for example, characters and images, and an operation unit that is used to operate the terminal apparatus 2a.

The controller 20 executes a FAX transmit/receive program 210 described below, thereby serving as a FAX reception section 200, a mail-contents generation section 201, a mail-title generation section 202, a mail communication section 203, a received-FAX reception section 204, and the like.

The FAX reception section 200 receives a FAX transmission request from a user of the terminal apparatus 2a. A user operating the operation unit (not illustrated) inputs a FAX transmission request along with the phone number of a transmission destination, and the scanning unit 24 reads out a document that is to be transmitted through FAX.

The mail-contents generation section 201 generates the contents of an electronic mail that is to be transmitted to the relay apparatus 1, on the basis of the FAX transmission request received by the FAX reception section 200 and the phone number of the transmission destination.

The mail-title generation section 202 generates the mail title of the electronic mail that is to be transmitted to the relay apparatus 1, on the basis of the FAX transmission request received by the FAX reception section 200 and the phone number of the transmission destination.

The mail communication section 203 receives/transmits electronic mails from/to the relay apparatus 1 via the private network 4.

The received-FAX reception section 204 receives image information stored in the distribution box corresponding to the terminal apparatus 2a among pieces of image information of received documents that are temporarily stored in the relay apparatus 1, via the private network 4.

The storage unit 21 stores, for example, the FAX transmit/receive program 210 for causing the controller 20 to operate as the above-described sections 200 to 204, and relay apparatus information 211.

The relay apparatus information 211 is information about the IP address of a relay apparatus to which the terminal apparatus 2a is allowed to transmit a FAX transmission instruction.

Operations of Communication System

The operations of the communication system 5 according to the first exemplary embodiment will be described below with reference to FIGS. 1 to 6 on the following topics: (1) a basic operation; (2) an operation of generating communication result information; and (3) an operation of generating a communication management report.

(1) Basic Operation

Figure 4A:
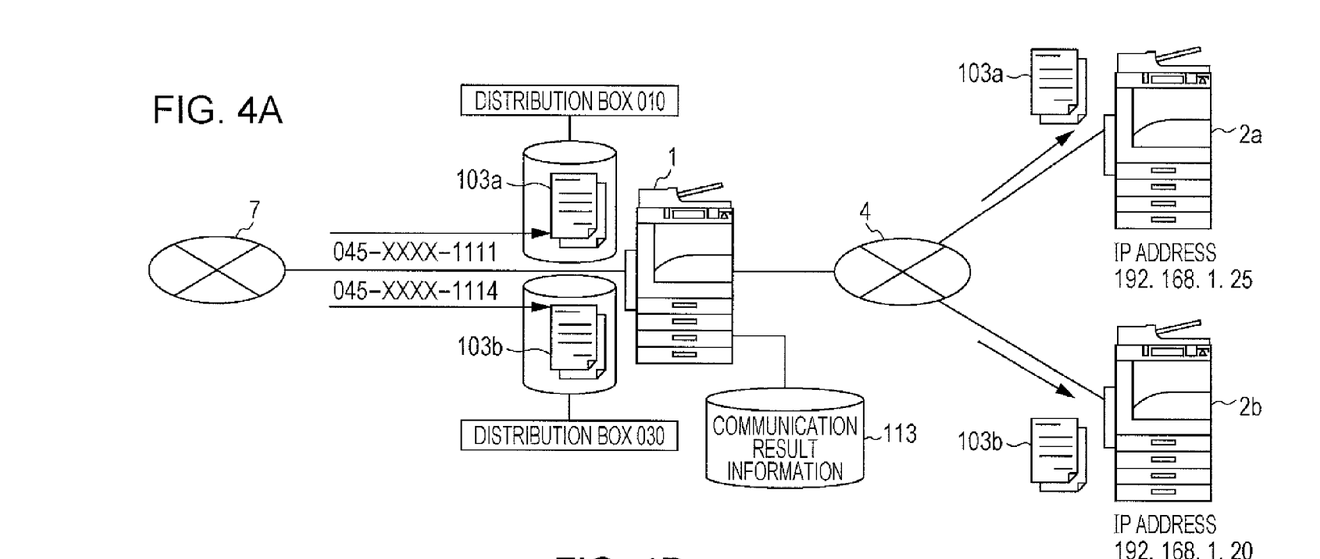
FIGS. 4A and 4B are schematic views for describing a FAX receiving operation.
Figure 4B:
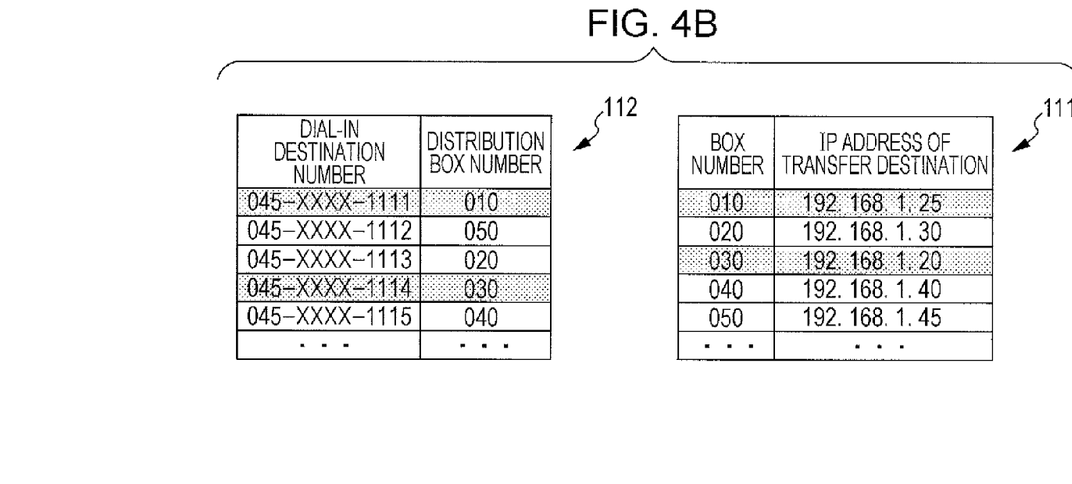

FIGS. 4A and 4B are schematic views for describing a FAX receiving operation.

As illustrated in FIG. 4A, the FAX communication section 103 of the relay apparatus 1 receives pieces of image information 103*a* and 103*b* of documents through FAX from the outside via the public network 7. The relay apparatus 1 is capable of receiving phone numbers by using dialing-in. The relay apparatus 1 receives the image information 103*a* of one document through FAX by using the phone number "045-XXXX-1111", whereas the relay apparatus 1 receives the image information 103*b* of another document through FAX by using the phone number "045-XXXX-1114".

Then, the received-FAX distribution section 104 of the relay apparatus 1 refers to the distribution-box information 112 for the individual dial-in numbers which is illustrated in FIG. 4B, and distributes the image information 103*a* and the image information 103*b* of the documents to the distribution boxes "010" and "030", respectively, in accordance with the phone numbers.

Then, the received-FAX distribution section 104 of the relay apparatus 1 refers to the transfer-destination information 111 for the individual boxes which is illustrated in FIG. 4B, and transmits the image information 103*a* and the image information 103*b* of the documents in the distribution boxes "010" and "030" to the terminal apparatuses 2*a* and 2*b* corresponding to the IP addresses "192.168.1.25" and "192.168.1.20" via the private network 4.

(2) Operation of Generating Communication Result Information

When the FAX communication section 103 receives the image information 103*a* and the image information 103*b* of the documents through FAX from the outside via the public network 7 as in "(1) Basic operation" described above, the communication-result-information generation section 105 generates information about the FAX reception as the communication result information 113 in the storage unit 11.

FIG. 5 is a schematic view illustrating an exemplary configuration of the communication result information 113.

Communication result information 113A is exemplary communication result information 113, and indicates information about FAX receptions performed by the FAX communication section 103. The communication result information 113A stores a document number for identifying each document, a start date and time when a FAX reception was started, a target indicating a FAX sender, a time required for a FAX reception, the number of pages of a document, a mode indicating a FAX communication mode, a communication type indicating whether a reception was distributed by using a phone number or was directly received by the relay apparatus 1, a distribution box to which distribution was performed when a reception was distributed by using a phone number, and a communication result indicating whether or not a FAX reception was normally performed.

(3) Operation of Generating Communication Management Report

Then, the communication-management-report generation section 106 refers to the communication result information 113A generated by the communication-result-information generation section 105. For example, when the number of communication results corresponding to the distribution box "010" reaches a predetermined number, the communication-management-report generation section 106 generates a communication management report 114 from the communication results.

The timing of generation of a communication management report 114 is a timing when the number of communication results reaches the predetermined number. Alternatively, the timing may be a timing when a predetermined time point has come, a timing when a predetermined time period has elapsed, or a timing obtained by combining these. Further, every time one communication result is obtained, the communication result may be added to the communication management report 114.

Figure 6:
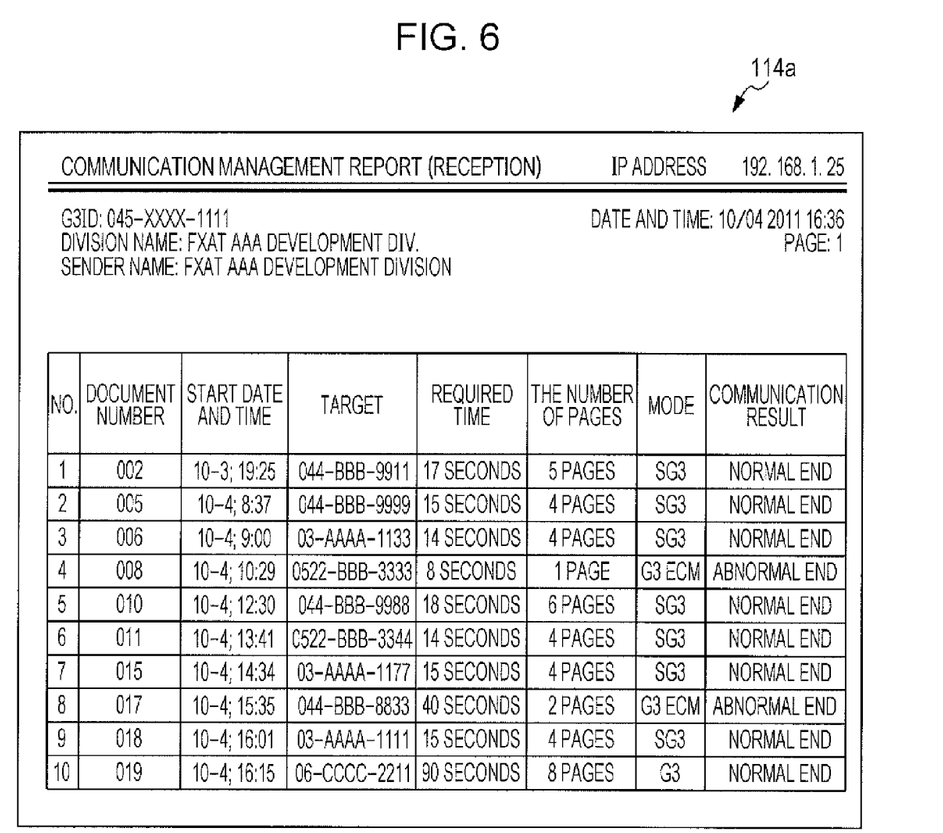
FIG. 6 is a schematic view illustrating an exemplary configuration of a communication management report.

FIG. 6 is a schematic view illustrating an exemplary configuration of the communication management report 114.

A communication management report 114*a* is an exemplary communication management report 114, and indicates information about FAX receptions of the terminal apparatus 2*a*. The communication management report 114*a* describes items similar to those of the communication result information 113A, but does not describe a communication type and a distribution box.

The mail communication section 100 transmits the communication management report 114*a* via the private network 4 to the terminal apparatus 2*a*. The communication management report 114*a* may be transmitted by using IFAX or by using an electronic mail to which the communication management report 114*a* is attached. Alternatively, the communication management report 114*a* may be stored in the distribution box "010" and may be transmitted to the terminal apparatus 2*a* in a manner similar to that for the image information 103*a* of a document.

Second Exemplary Embodiment

A second exemplary embodiment is different from the first exemplary embodiment in which a communication management report about FAX reception is generated. The difference is in that a communication management report about FAX transmission is generated.

Operations of Communication System

The operations of the communication system 5 according to the second exemplary embodiment will be described below with reference to FIGS. 1 to 3 and 7 to 9 on the following topics: (1) a basic operation; (2) an operation of generating communication result information; and (3) an operation of generating a communication management report. Operations similar to those in the first exemplary embodiment will not be described.

(1) Basic Operation

Figure 7:
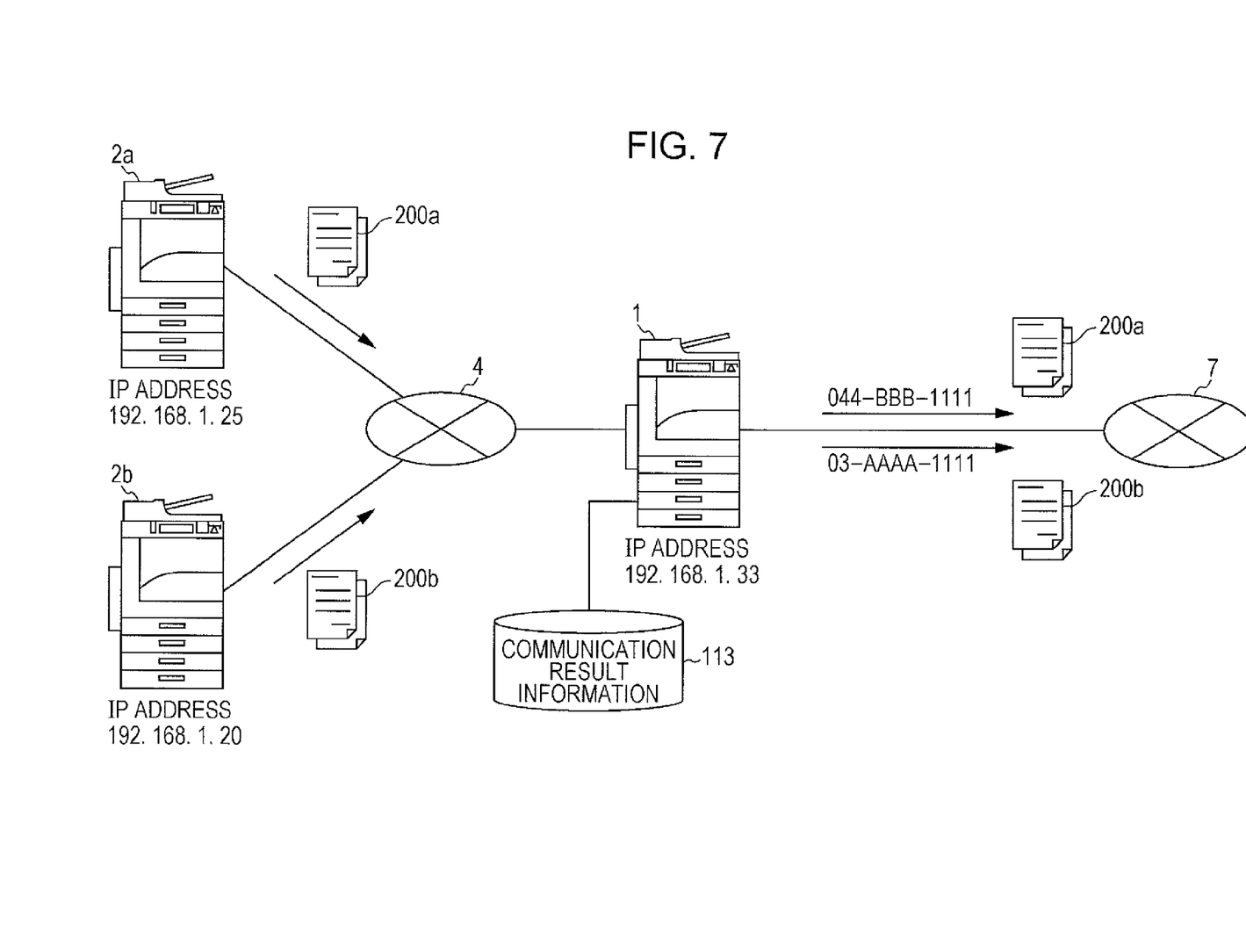
FIG. 7 is a schematic view for describing a FAX transmission operation.

FIG. 7 is a schematic view for describing a FAX transmission operation.

As illustrated in FIG. 7, users of the terminal apparatuses 2*a* and 2*b* operate the operation units (not illustrated) of the terminal apparatuses 2*a* and 2*b*, and prepare for FAX transmission. Description will be made below by taking the operations of the terminal apparatus 2*a* as a typical example, and the operations of the terminal apparatus 2*b* will be described in parentheses when they are different from those of the terminal apparatus 2*a*.

In response to an operation performed by a user, the FAX reception section 200 of the terminal apparatus 2*a* starts reception of a FAX transmission request. The FAX reception section 200 receives the phone number of a transmission destination, and prompts the user to set a document which is to be a target of the FAX transmission on the document table of the scanning unit 24 of the terminal apparatus 2*a*.

The user inputs the phone number of a transmission destination, sets a document on the document table, and operates the operation unit so as to cause the scanning unit 24 to scan the document.

The FAX reception section 200 of the terminal apparatus 2a causes the scanning unit 24 to scan the document optically, and generates image information 200a (200b).

As illustrated in FIG. 7, the terminal apparatus 2a attaches the generated image information 200a of the document to an electronic mail having a mail title including "FAX=044BBB1111@[192.168.1.33]" ("FAX=03AAAA1111@[192.168.1.33]"), and transmits the mail, thereby instructing the relay apparatus 1 to perform FAX transmission.

The mail-contents generation section 201 generates the contents of the electronic mail that is to be transmitted to the relay apparatus 1, on the basis of the FAX transmission request received by the FAX reception section 200 and the phone number of the transmission destination. In the second exemplary embodiment, particular text or the like is not input in the contents.

The mail-title generation section 202 generates the mail title of the electronic mail that is to be transmitted to the relay apparatus 1, on the basis of the FAX transmission request received by the FAX reception section 200 and the phone number of the transmission destination. In the example illustrated in FIG. 7, the phone number of the FAX transmission destination is "044-BBB-1111" ("03-AAAA-1111"), and the IP address of the relay apparatus 1 is "192.168.1.33". Accordingly, the mail title is "FAX=044BBB1111@[192.168.1.33]" ("FAX=03AAAA1111@[192.168.1.33]").

The mail communication section 203 attaches the image information 200a (200b) to the electronic mail generated by the mail-contents generation section 201 and the mail-title generation section 202, and transmits the mail to the relay apparatus 1.

The mail communication section 100 of the relay apparatus 1 receives the electronic mail transmitted by the terminal apparatus 2a. The mail-title analysis section 101 analyzes the mail title of "FAX=044BBB1111@[192.168.1.33]" ("FAX=03AAAA1111@[192.168.1.33]"), and recognizes "044-BBB-1111" ("03-AAAA-1111") as the FAX number of the transmission destination.

The FAX communication section 103 transmits the image information 200a (200b) attached to the electronic mail, through FAX to "044-BBB-1111" ("03-AAAA-1111").

(2) Operation of Generating Communication Result Information

When the FAX communication section 103 transmits the image information 200a and the image information 200b through FAX via the public network 7 to the outside as in "(1) Basic operation" described above, the communication-result-information generation section 105 generates information about the FAX transmission as the communication result information 113 in the storage unit 11.

FIG. 8 is a schematic view illustrating an exemplary configuration of the communication result information 113.

Communication result information 113B is exemplary communication result information 113, and indicates information about FAX transmissions performed by the FAX communication section 103. The communication result information 113B describes items similar to those of the communication result information 113A, but describes an instruction source instead of a distribution box. An instruction source indicates the IP address of a terminal apparatus which transmitted a FAX transmission instruction.

(3) Operation of Generating Communication Management Report

The communication-management-report generation section 106 refers to the communication result information 113B generated by the communication-result-information genera-tion section 105. For example, when the number of communication results corresponding to the instruction source of "192.168.1.25" reaches a predetermined number, the communication-management-report generation section 106 generates a communication management report 114 from the communication results.

Figure 9:
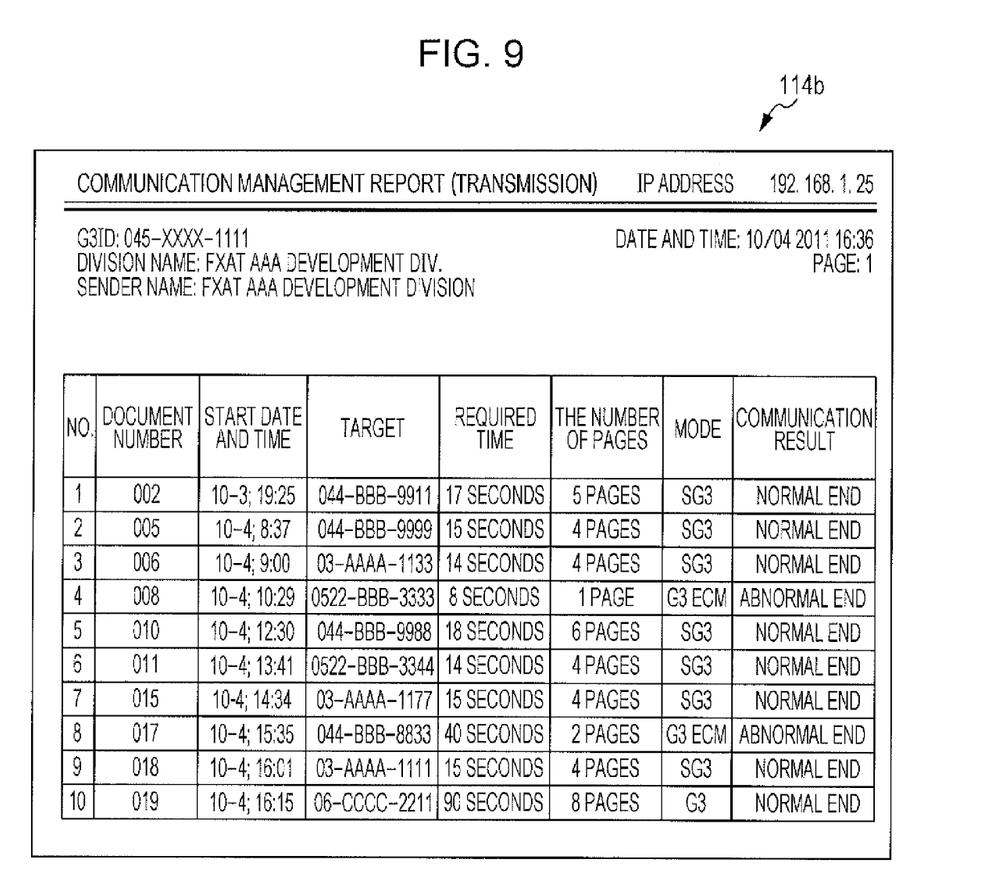
FIG. 9 is a schematic view illustrating an exemplary configuration of a communication management report.

FIG. 9 is a schematic view illustrating an exemplary configuration of the communication management report 114.

A communication management report 114b is an exemplary communication management report 114, and indicates information about FAX transmissions performed for the terminal apparatus 2a. The communication management report 114b describes items similar to those of the communication result information 113B, but does not describe a communication type and an instruction source.

The mail communication section 100 transmits the communication management report 114b via the private network 4 to the terminal apparatus 2a. The communication management report 114b may be transmitted by using the IFAX scheme or by using an electronic mail to which the communication management report 114b is attached. Alternatively, the communication management report 114b may be stored in the distribution box "010" and may be transmitted to the terminal apparatus 2a in a manner similar to that for the image information of a received document.

Third Exemplary Embodiment

A third exemplary embodiment is one obtained by combining the communication management report 114a in the first exemplary embodiment which is generated for reception with the communication management report 114b in the second exemplary embodiment which is generated for transmission.

FIG. 10 is a schematic view illustrating an exemplary configuration of the communication management report 114.

A communication management report 114c is an exemplary communication management report 114, and indicates the combination of information about FAX reception and information about FAX transmission for the terminal apparatus 2a. The communication management report 114c describes items similar to those of these pieces of information.

The communication result information 113 used when the communication management report 114c is generated is obtained by combining the communication result information 113A in the first exemplary embodiment and the communication result information 113B in the second exemplary embodiment.

Fourth Exemplary Embodiment

Compared with the first to third exemplary embodiments, a fourth exemplary embodiment is different in that a date and time when the relay apparatus 1 received a FAX transmission instruction in FAX transmission is added and that a date and time when the image information of a document was transmitted to a terminal apparatus in FAX reception is added.

FIG. 11 is a schematic view illustrating an exemplary configuration of the communication management report 114.

A communication management report 114d is an exemplary communication management report 114, and indicates information obtained by combining information about FAX reception with information about FAX transmission for the terminal apparatus 2a. The communication management report 114d describes a reception date and time of the relay apparatus as information about transmission and a transfer date and time as information about reception.

The reception date and time of the relay apparatus is a date and time when the mail communication section 100 of the relay apparatus 1 received a FAX transmission instruction from a corresponding one of the terminal apparatuses 2a to 2c.

The transfer date and time is a date and time when the mail communication section 100 of the relay apparatus 1 transmitted the image information of a document which was received by the FAX communication section 103 from the outside and which was stored in a distribution box by the received-FAX distribution section 104, from the distribution box to a corresponding one of the terminal apparatuses 2a to 2c.

The communication-management-report generation section 106 compares a reception date and time of the relay apparatus with a start date and time, and compares a transfer date and time with a start date and time. When the time interval between these time points is larger than a predetermined interval, the communication-management-report generation section 106 may emphasize, for example, highlights, display of such information in the communication management report 114d.

Other Exemplary Embodiments

The present invention is not limited to the above-described exemplary embodiments, and various modifications may be made as long as they do not depart from the gist of the present invention.

The FAX transmit/receive programs 110 and 210 described above may be provided by using a storage medium such as a compact disc-read-only memory (CD-ROM) storing them, or may be downloaded from, for example, a server apparatus connected to a network such as the Internet to a storage unit in the apparatuses. Alternatively, some or all of the units 100 to 106 and 200 to 204 may be achieved through hardware such as an application-specific integrated circuit (ASIC). The steps in the operations described in the above-described exemplary embodiments may be modified in such a manner that change of the execution sequence, a skip of some of the steps, and addition of steps are performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relay apparatus comprising:
a reception section that receives, from a plurality of terminal apparatuses having no facsimile transmission functions, facsimile transmission instructions along with pieces of identification information of the plurality of terminal apparatuses via a private network;
a facsimile communication section that performs facsimile transmission via a public network to the outside on the basis of the facsimile transmission instructions received by the reception section;
a generation section that generates pieces of communication result information about facsimile transmission for the respective pieces of identification information corresponding to the plurality of terminal apparatuses when the facsimile communication section performs the facsimile transmission to the outside; and
a communication management report generation section that generates a communication management report, the report including a plurality of the communication results,
wherein the generation section emphasizes display of a facsimile transmission in which a time period from a first date and time to a second date and time is equal to or longer than a predetermined time period, the first date and time indicating when the reception section received a facsimile transmission instruction from a terminal apparatus of the plurality of apparatuses, the second date and time indicating when the facsimile communication section finished communication with the outside.

2. The relay apparatus according to claim 1,
wherein the generation section has at least a date and time when the facsimile communication section finished a transmission to the outside, as the communication result information.

3. The relay apparatus according to claim 2,
wherein the generation section further has a date and time when the reception section received a facsimile transmission instruction from the terminal apparatus among the plurality of terminal apparatuses, as the communication result information.

4. A relay apparatus comprising:
a facsimile communication section that performs facsimile reception from the outside through lines of a public network which correspond to a plurality of terminal apparatuses having no facsimile reception functions and being capable of communicating with the facsimile communication section via a private network;
a generation section that generates pieces of communication result information about facsimile reception for the respective lines corresponding to the plurality of terminal apparatuses when the facsimile communication section performs the facsimile reception from the outside;
a communication management report generation section that generates a communication management report, the report including a plurality of the communication results; and
a distribution section that distributes documents received through facsimile from the outside by the facsimile communication section, to the plurality of terminal apparatuses corresponding to the lines,
wherein the generation section emphasizes display of a facsimile reception in which a time period from a first date and time to a second date and time is equal to or longer than a predetermined time period, the first date and time indicating when the facsimile communication section started a reception from the outside, the second date and time indicating when the distribution section distributed the document to a terminal apparatus of the plurality of apparatuses.

5. The relay apparatus according to claim 4,
wherein the generation section has at least a date and time when the facsimile communication section started a reception from the outside, as the communication result information.

6. The relay apparatus according to claim 5,
wherein the generation section further has a date and time when the distribution section distributed a document among the received documents to the terminal apparatus among the plurality of terminal apparatuses, as the communication result information.

7. A non-transitory computer readable medium storing a program causing a computer to execute a process for receiving/transmitting a facsimile, the process comprising:

receiving, from a plurality of terminal apparatuses having no facsimile transmission functions, facsimile transmission instructions along with pieces of identification information of the plurality of terminal apparatuses via a private network;

performing facsimile transmission via a public network to the outside on the basis of the received facsimile transmission instructions;

generating pieces of communication result information about facsimile transmission for the respective pieces of identification information corresponding to the plurality of terminal apparatuses when the facsimile transmission is performed to the outside; and generating a communication management report, the report including a plurality of the communication results, wherein generating the pieces of communication result information emphasizes display of a facsimile transmission in which a time period from a first date and time to a second date and time is equal to or longer than a predetermined time period, the first date and time indicating when the facsimile transmission instruction was received from a terminal apparatus of the plurality of apparatuses, the second date and time indicating when the communication finished with the outside.

8. A non-transitory computer readable medium storing a program causing a computer to execute a process for receiving/transmitting a facsimile, the process comprising:

performing facsimile reception from the outside through lines of a public network which correspond to a plurality of terminal apparatuses having no facsimile reception functions and being capable of performing communication section via a private network;

generating pieces of communication result information about facsimile reception for the respective lines corresponding to the plurality of terminal apparatuses when the facsimile reception is performed from the outside;

generating a communication management report, the report including a plurality of the communication results; and distributing documents received through facsimile reception from the outside, to the plurality of terminal apparatuses corresponding to the lines, wherein the generating pieces of communication result information emphasizes display of a facsimile reception in which a time period from a first date and time to a second date and time is equal to or longer than a predetermined time period, the first date and time indicating when a reception from the outside was started, the second date and time indicating when the document was distributed to a terminal apparatus of the plurality of apparatuses.

* * * * *